United States Patent
Ni et al.

(10) Patent No.: US 10,775,242 B2
(45) Date of Patent: Sep. 15, 2020

(54) TRACKING AND RANGING SYSTEM AND METHOD THEREOF

(71) Applicant: Quanta Computer Inc., Taoyuan (TW)

(72) Inventors: Ming-Hong Ni, Taoyuan (TW); Chien-Hung Liu, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 94 days.

(21) Appl. No.: 16/255,977

(22) Filed: Jan. 24, 2019

(65) Prior Publication Data
US 2020/0003624 A1 Jan. 2, 2020

(30) Foreign Application Priority Data
Jul. 2, 2018 (TW) .............................. 107122805 A (51) Int. Cl.
*G01J 5/02* (2006.01)
*G01C 3/08* (2006.01)
(Continued)

(52) U.S. Cl.
CPC .............. *G01J 5/0275* (2013.01); *G01C 3/08* (2013.01); *G06T 7/20* (2013.01); *G06T 7/521* (2017.01);
(Continued)

(58) Field of Classification Search
CPC combination set(s) only.
See application file for complete search history.

(56) References Cited

U.S. PATENT DOCUMENTS

| 8,173,959 B1* | 5/2012 | Boumsellek | G01N 27/622 |
| | | | 250/281 |
| 2009/0085935 A1* | 4/2009 | Yamashita | G06F 3/0481 |
| | | | 345/660 |

(Continued)

FOREIGN PATENT DOCUMENTS

TW 107764405 A 3/2018

OTHER PUBLICATIONS

Chinese language Office Action dated Dec. 6, 2018, issued in application No. TW 107122805.
(Continued)

*Primary Examiner* — Tsung Yin Tsai
(74) *Attorney, Agent, or Firm* — McClure, Qualey & Rodack, LLP (57) ABSTRACT

A tracking and ranging system includes a thermal sensor device, a controller, a ranging device and a transmission device. The thermal sensor device is configured to capture a thermal image. The controller analyzes the thermal image to identify the main heat source from among the heat sources displayed in the thermal image, and obtain an offset distance between the center points of the main heat source and the thermal image. The ranging device is coupled to the controller. The transmission device loads the ranging device and is coupled to the controller. The controller controls the motion of the transmission device in accordance with the offset distance to correct the offset angle between the ranging device and the object corresponding to the main heat source. After correcting the offset angle, the ranging device detects a first distance to the object by transmitting energy and receiving reflected energy.

10 Claims, 5 Drawing Sheets

(51) Int. Cl.
G06T 7/521 (2017.01)
G06T 7/20 (2017.01)
H04N 5/33 (2006.01)
G01J 5/00 (2006.01)

(52) U.S. Cl.
CPC ......... G01J 2005/0077 (2013.01); G06T 2207/10028 (2013.01); G06T 2207/10048 (2013.01); H04N 5/33 (2013.01)

(56) References Cited

U.S. PATENT DOCUMENTS

| | | | | |
|---|---|---|---|---|
| 2010/0103311 A1* | 4/2010 | Makii | .................. | G06T 7/571 |
| | | | | 348/369 |
| 2012/0044347 A1* | 2/2012 | Sugio | .................. | H04N 5/23296 |
| | | | | 348/135 |
| 2013/0343603 A1* | 12/2013 | Choi | .................. | G06T 5/005 |
| | | | | 382/103 |
| 2017/0116725 A1* | 4/2017 | Stuart | .................. | G01B 11/272 |

OTHER PUBLICATIONS

Jhang, H.C.; "Application of Infrared Thermal Image Analysis Techniques Applied Research on Campus Security Patrol System;" Dec. 2018; pp. 1-130.
English language translation of abstract of "Application of Infrared Thermal Image Analysis Techniques Applied Research on Campus Security Patrol System;" p. 4 of publication.

* cited by examiner

TRACKING AND RANGING SYSTEM AND METHOD THEREOF

CROSS REFERENCE TO RELATED APPLICATIONS

This application claims priority to and the benefit of Taiwan Application No. 107122805, filed Jul. 2, 2018.

FIELD OF THE PRESENT INVENTION

The present invention relates to a ranging device, and especially to a ranging device with a tracking function and an operation method thereof.

DESCRIPTION OF THE RELATED ART

At present, when commercially available mechanical devices such as robots and unmanned aerial vehicles interact with humans, a 3D camera is often used to continuously film the humans, and the position and distance of each humans is calculated by a high-performance processer computing platform for use in subsequent applications.

However, lots of computing processes and power consumption are required for filming with a 3D camera, and so a high-capacity battery is required. The volume of such mechanical devices cannot be reduced, and the motors inside the mechanical devices need to push heavy loads. Therefore, how to resolve the issues above and to reduce a machine's dependence on computing performance is an important topic.

BRIEF SUMMARY OF THE PRESENT INVENTION

In order to resolve the issue described above, the present invention discloses a ranging system and method thereof using a thermal sensor device.

An embodiment of the present invention discloses a tracking and ranging system that includes a thermal sensor device, a controller, a ranging device, and a transmission device. The thermal sensor device is configured to capture a thermal image. The controller analyzes the thermal image to identify the main heat source from among all the heat sources displayed in the thermal image, and then to obtain the offset distance between the main heat source and the center point of the thermal image. The ranging device is coupled to the controller. The transmission device loads the ranging device and is coupled to the controller. The controller controls the motion of the transmission device in accordance with the offset distance to correct the offset angle between the ranging device and the object corresponding to the main heat source. After correcting the offset angle, the ranging device detects the first distance from the tracking and ranging system to the object by transmitting energy and receiving reflected energy.

The present invention also discloses a tracking and ranging method, which is used in a tracking and ranging system that includes a thermal sensor device, a controller, a ranging device, and the transmission device that loads the ranging device. The method includes the thermal sensor device capturing a thermal image, analyzing the thermal image to identify the main heat source from the heat sources displayed in the thermal image, and then the controller obtains the offset distance between the center point of the main heat source and the thermal image. The controller controls the motion of the transmission device in accordance with the offset distance to correct the offset angle between the ranging device and the object corresponding to the main heat source. After correcting the offset angle, the ranging device detects the first distance to the object by transmitting energy and receiving reflected energy.

DETAILED DESCRIPTION OF THE PRESENT INVENTION

The present invention can be more fully understood by reading the subsequent detailed description with references made to the accompanying figures.

It should be understood that the figures are not drawn to scale in accordance with standard practice in the industry. In fact, it is allowed to arbitrarily enlarge or reduce the size of devices for clear illustration.

Figure 1:
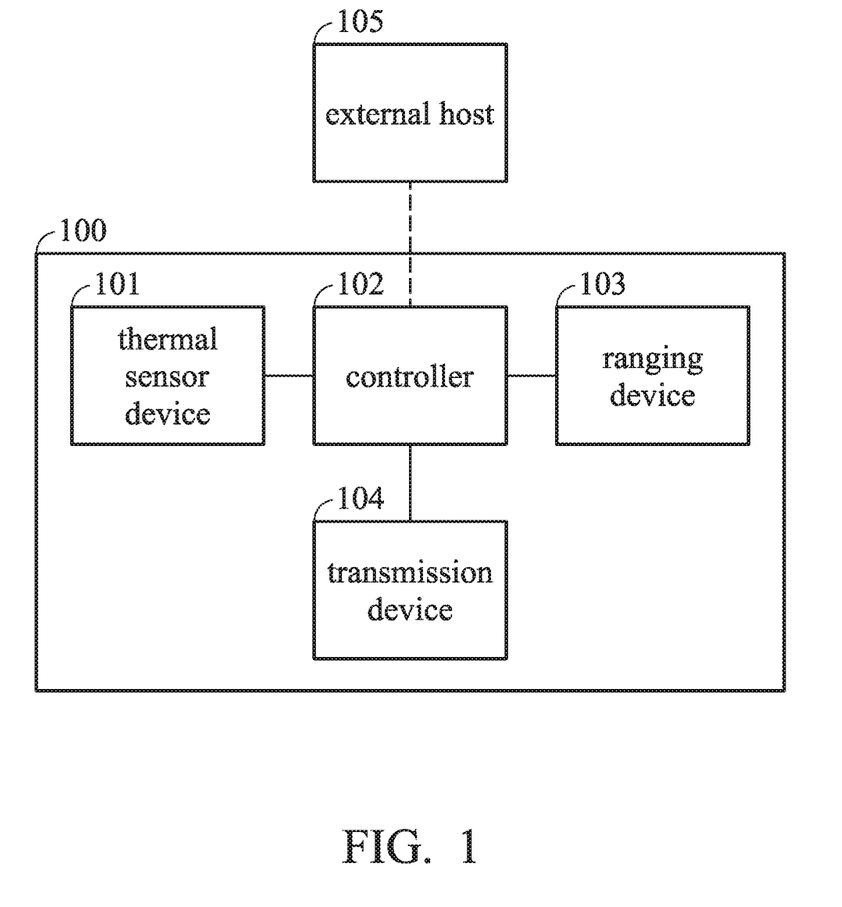
FIG. 1 is a block diagram of a tracking and ranging system in accordance with a first embodiment of the disclosure.

FIG. 1 is a block diagram of a tracking and ranging system in accordance with a first embodiment of the disclosure. A tracking and ranging system 100 includes a thermal sensor device 101, a controller 102, a ranging device 103, and transmission device 104. The tracking and ranging system 100 can be coupled to an external host 105 to receive ranging commands from the external host 105, and send the ranging information back to the external host 105. The tracking and ranging system 100 can be coupled to the external host 105 by wire or wirelessly, but the present invention does not limit it thereto.

The thermal sensor device 101 can be an infrared sensor device, an infrared camera, and a thermal sensor device, etc., which are configured to capture a thermal image. The controller 102 can be a microcontroller unit (MCU) or an Application-Specific Integrated Circuit (ASIC), etc., to analyze the thermal image to identify the main heat source from among the heat sources displayed in the thermal image, and to obtain the offset distance between the center point of the main heat source and the thermal image. The controller 102 controls the motion of the transmission device 104 in accordance with the offset distance to correct the offset angle between the ranging device 103 and the object corresponding to the main heat source, and after correcting the offset angle, the controller 102 detects a first distance to the object using the ranging device 103.

The ranging device 103 can be a supersonic ranging device, a laser ranging device, etc., but the present invention does not limit it thereto. The ranging device 103 detects the first distance from the tracking and ranging system 100 to the object by transmitting energy and receiving reflected energy. In the present embodiment, the ranging device 103 includes a supersonic transmitter (e.g., speaker) and a supersonic receiver (e.g., microphone), and is coupled to the controller 102. The ranging device 103 detects the first distance using the supersonic transmitter that transmits a supersonic signal, and the supersonic receiver that receives the reflected supersonic signal corresponding to the aforementioned supersonic signal. The ranging device 103 can transmit the supersonic signal at a fixed frequency, such as 40 KHz, 56 KHz, 60 KHz, etc., and the controller 102 controls the supersonic transmitter to continuously transmit a 101010 supersonic signal. After the supersonic signal is reflected by an obstacle, the supersonic receiver receives the reflected supersonic signal at the aforementioned fixed frequency.

The transmission device 104 may be a stepper motor or a mechanical arm, etc. The transmission device 104 loads the ranging device 103 and the thermal sensor device 101. The transmission device 104 is coupled to the controller 102. The transmission device 104 is controlled by the controller 102 to move or rotate the ranging device 103 and the thermal sensor device 101 to track an object. In the present embodiment, the transmission device 104 is a stepper motor, but the present invention is not limited thereto.

Figure 2:
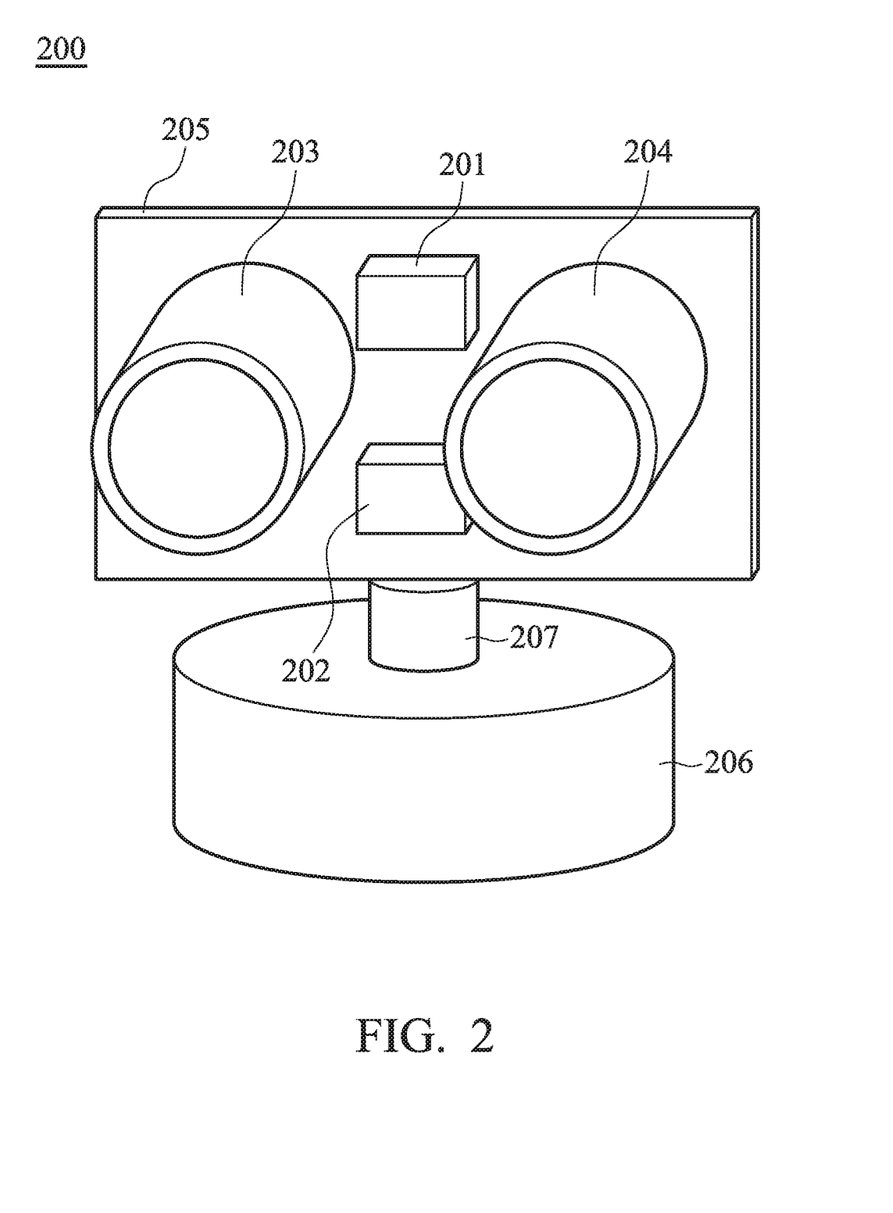
FIG. 2 is a schematic diagram of the tracking and ranging system in accordance with the first embodiment of the disclosure.

FIG. 2 is a schematic diagram of the tracking and ranging system 200 in accordance with the first embodiment of the disclosure. The tracking and ranging system 200 in FIG. 2 is an implementation mode based on the tracking and ranging system 100 in FIG. 1. A thermal sensor device 201, controller 202 and a ranging device in the tracking and ranging system 200 can be arranged on the same PCB board 205. The ranging device includes a supersonic transmitter 203 and a supersonic receiver 204. The thermal sensor device 201 is arranged in the middle of the supersonic transmitter 203 and the supersonic receiver 204 to reduce the error between the thermal image captured by the thermal sensor device 201 and the tracking and ranging device. The transmission device can be a stepper motor 206 that loads a PCB board 205 via a rotating shaft 207, so that the PCB board 205 can rotate over 360 degrees. The rotation of the stepper motor 206 is controlled by the controller 202 to track the heat source object. The tracking and ranging system 200 can be coupled to an external host (not shown in the figure) to receive commands and send back the distance of the heat source. Details of the method by which the controller 202 tracks the heat source object and detects the distance are described below.

Figure 3:
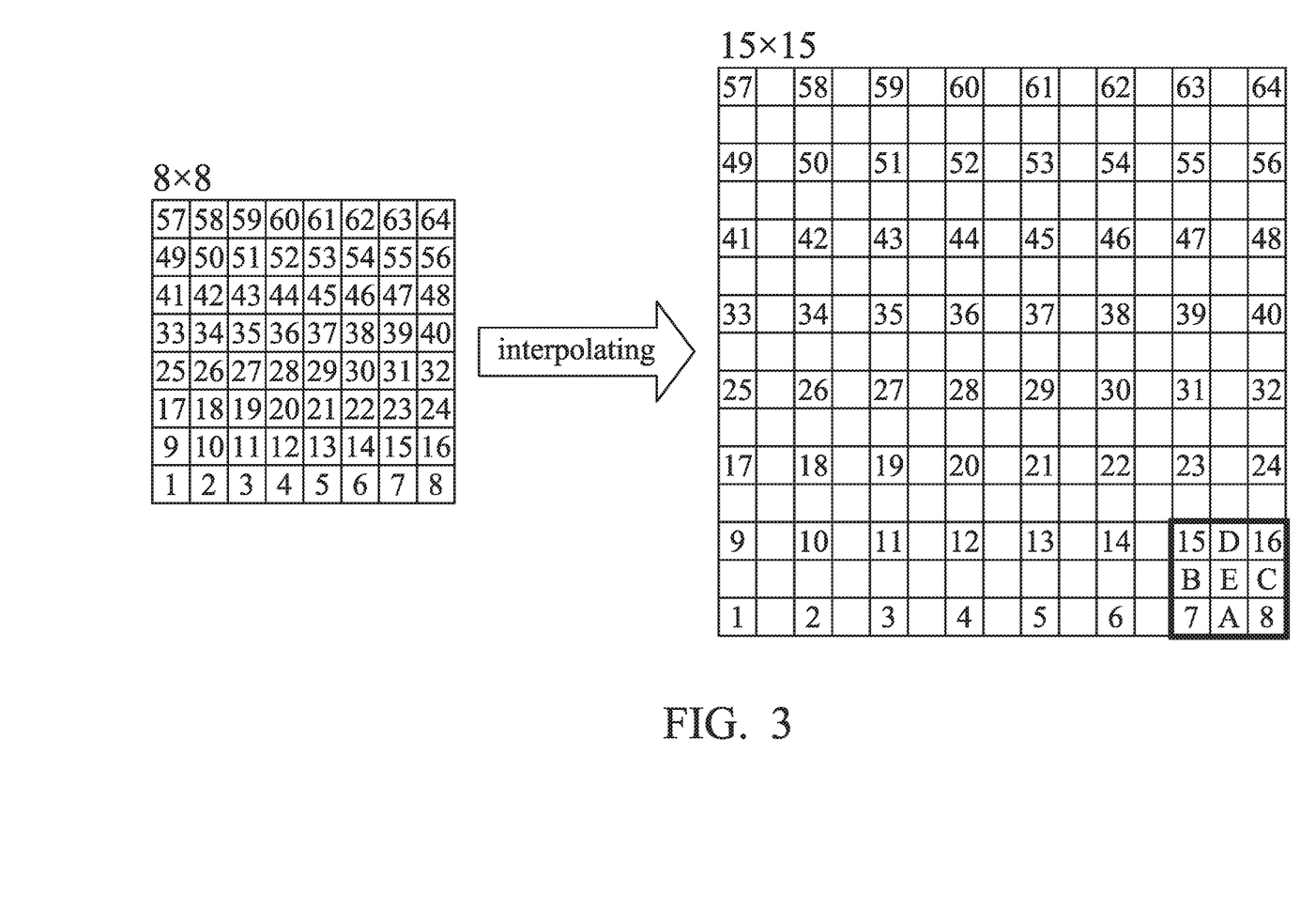
FIG. 3 is a schematic diagram of a controller interpolating a thermal image in accordance with the first embodiment of the disclosure.

Referring to FIG. 3, FIG. 3 is a schematic diagram of a controller 102 interpolating a thermal image in accordance with the first embodiment of the disclosure. In the present embodiment, an original thermal image that captured by the thermal sensor device 101 is a 2D image at 8×8 resolution (with 64 pixels). As shown in the left figure of FIGS. 3, 1 to 64 represents a number of each pixel in the thermal image at 8×8 resolution, and can respectively capture luminance that represents the corresponding temperature. The luminance can be a 0 to 255 grayscale value, but the present invention does not limit it thereto.

First, the controller 102 interpolates the original thermal image, so that the resolution can be increased from 8×8 to 15×15 (with 225 pixels). A detailed description follows. As shown in the right figure of FIG. 3, the interpolation involves calculating the luminance of unknown pixels A, B, C, and D according to the luminance of known pixels 7, 8, 15 and 16. For example, the luminance of pixel A equals the luminance of pixel 7 plus pixel 8 and divided by 2. The luminance of pixel B is equal to the luminance of pixel 7 plus pixel 15 and divided by 2. The luminance of pixel C is equal to the luminance of pixel 8 plus pixel 16 and divided by 2. The luminance of pixel D equals the luminance of pixel 15 plus pixel 16 and divided by 2. Finally, the luminance of pixel E equals to the luminance of pixel A plus pixel plus pixel B plus pixel C plus pixel D and divided by 4. The calculation method of the interpolation described above is just an example, the present invention does not limit it thereto. Therefore, the controller 102 can obtain a thermal image at 15×15 resolution for subsequent image processing.

Figure 4A:
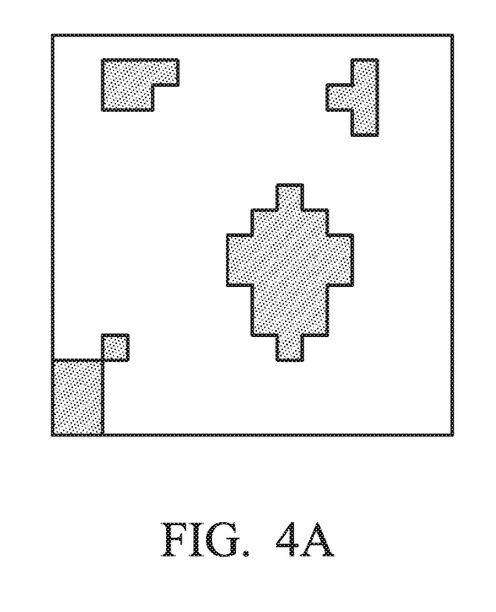
FIGS. 4A and 4B are a schematic diagram of the controller capturing the main heat source in accordance with the first embodiment of the disclosure.
Figure 4B:
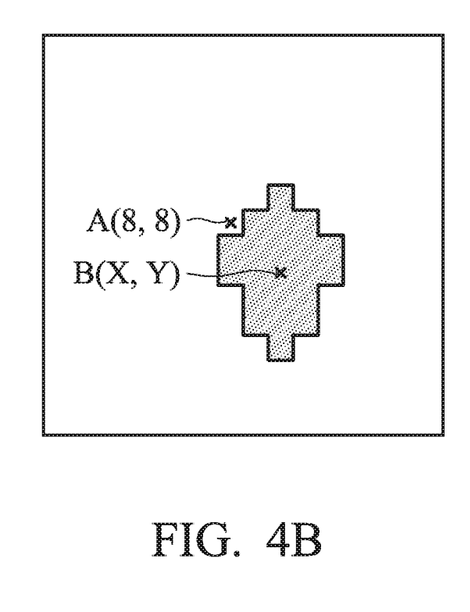

Refer to FIGS. 4A and 4B, which are a schematic diagram of the controller 102 capturing the main heat source in accordance with the first embodiment of the disclosure. After obtaining a thermal image at 15×15 resolution, the controller 102 first removes noise from the thermal image, and for example, only designates the pixels whose luminance is greater than or equal to a threshold value, and the reserved pixels are displayed in full white to obtain at least one heat source block. The threshold value can be 128 in luminance, but is not limited thereto. As shown in FIG. 4A, a plurality of heat source blocks after having had noise removed are shown. Then, the controller 102 only designates the heat source block with the maximum area as the main heat source. As shown in FIG. 4B, the controller 102 only designates the heat source block with the maximum area as the main heat source, and removes the other heat source blocks. So far, the controller 102 can identify the essential main heat source among the heat sources that are displayed in the thermal image. The object corresponding to the main heat source can be the user, or a subject that is interacting with the tracking and ranging system 100.

Then, the controller 102 calculates the offset distance between the main heat source and a center point of the thermal image. The controller 102 obtains the central position of the main heat source to calculate the offset distance between the central position of the main heat source and the center point of the thermal image. The central position of the main heat source can be a center of gravity closed to the main heat source. As shown in FIG. 4B, the center point of the thermal image at 15×15 resolution is located at point A(8,8), and the central position of the main heat source is located at point B (X,Y). In the present embodiment, transmission device 104 is a stepper motor and can only rotate along a horizontal axis (X axis). Therefore, the controller 102 calculates the offset distance between the central position of the main heat source and the center point of the thermal image, that is, calculates the offset distance between point A and point B along X axis. The controller 102 input the offset distance into a rotation angle list of the stepper motor to convert the offset distance into an offset angle, controls the stepper motor to rotate the ranging device 103 in accordance with the offset angle, so that the ranging device 103 can be aligned with the object (the user or the subject described above) corresponding to the main heat source.

In the present embodiment, the ranging device 103 includes a supersonic transmitter and a supersonic receiver, thus, by the action of the stepper motor rotating the ranging device 103, the object corresponding to the main heat source can be retained in the middle of the supersonic transmitter and the supersonic receiver. It should be understood that in the other embodiment, if the transmission device 104 is a mechanical arm or another device that can move arbitrarily in 2D or 3D space, then the controller 102 can calculate the 2D offset distance between the central position of the main heat source and the center point of the thermal image. That is, it can calculate the offset distance between point A and point B along the X axis and the Y axis, and input the offset distance into the rotation angle list of the transmission device 104 to correct the offset angle between the ranging device 103 and the object corresponding to the main heat source. This is so that the ranging device 103 can be precisely retained at the center of the object corresponding to the main heat source.

Furthermore, after the ranging device 103 is aligned with the object corresponding to the main heat source, the controller 102 controls the supersonic transmitter to transmit a supersonic signal at a fixed frequency, and starts timing. The controller 102 waits for a predetermined time period (such as 5 seconds) to receive the reflected supersonic signal. If there is no reflected supersonic signal, the controller 102 obtains the thermal image again to calibrate the object corresponding to the main heat source. If there is a reflected supersonic signal, the controller 102 amplifies the received reflected supersonic signal via an internal OP amplifier, and uses a comparator to compare the received reflected supersonic signal with a predetermined voltage to determine whether the received reflected supersonic signal is higher than the predetermined voltage. The predetermined voltage can be 0.9 volts, but is not limited thereto. If the received reflected supersonic signal is lower than the predetermined voltage, then the comparator determines that the received reflected supersonic signal is invalid; if the received reflected supersonic signal is higher than the predetermined voltage, the controller 102 stops timing, and multiplies the counted time by the speed of sound (such as about 340 meter per second) and divides this by 2 to obtain the first distance between the object corresponding to the main heat source and the tracking and ranging system 100.

Next, in response to the movement of the object corresponding to the main heat source at any time, the tracking and ranging system 100 should have a function for tracking the object. Therefore, after the ranging device detects the first distance, the controller 102 analyzes an updated thermal image again, and follows the method described above to correct the offset angle between ranging device 103 and the object corresponding to the main heat source in accordance with the updated thermal image.

Then, the controller 102 controls the ranging device 103 to detect the object again to obtain a second distance. The controller 102 calculates the difference between the first distance and the second distance to determine whether the difference is greater than a predetermined value. For example, the predetermined value may be 10 centimeters, but it is not limited thereto. When the difference is smaller than or equal to the predetermined value, the controller 102 informs the external host about the detected second distance, and the ranging process ends. When the difference is greater than the predetermined value, the controller 102 analyzes another updated thermal image again to obtain another offset angle, and controls the transmission device 104 to rotate the ranging device 103 in accordance with one-half of another offset angle. The controller 102 detects a third distance and determines again whether the difference between the third distance and the second distance, which was detected last time, is smaller than the predetermined value. When the difference is still greater than the predetermined value, that means that the object corresponding to the main heat source is still moving. The controller 102 obtains another offset angle, and controls the transmission device 104 to rotate the ranging device 103 in accordance with one-quarter of the other offset angle. Similarly, if the difference between the latest distance and the distance that was detected last time is still greater than the predetermined value, the controller 102 controls the transmission device 104 to rotate the ranging device 103 in accordance with one-eighth of another updated offset angle. The rotating angle becomes one-half, one-quarter and one-eighth with the meaning that to avoid the tracking and ranging system 100 arbitrarily tracking the continuously moving object to damage.

Figure 5:
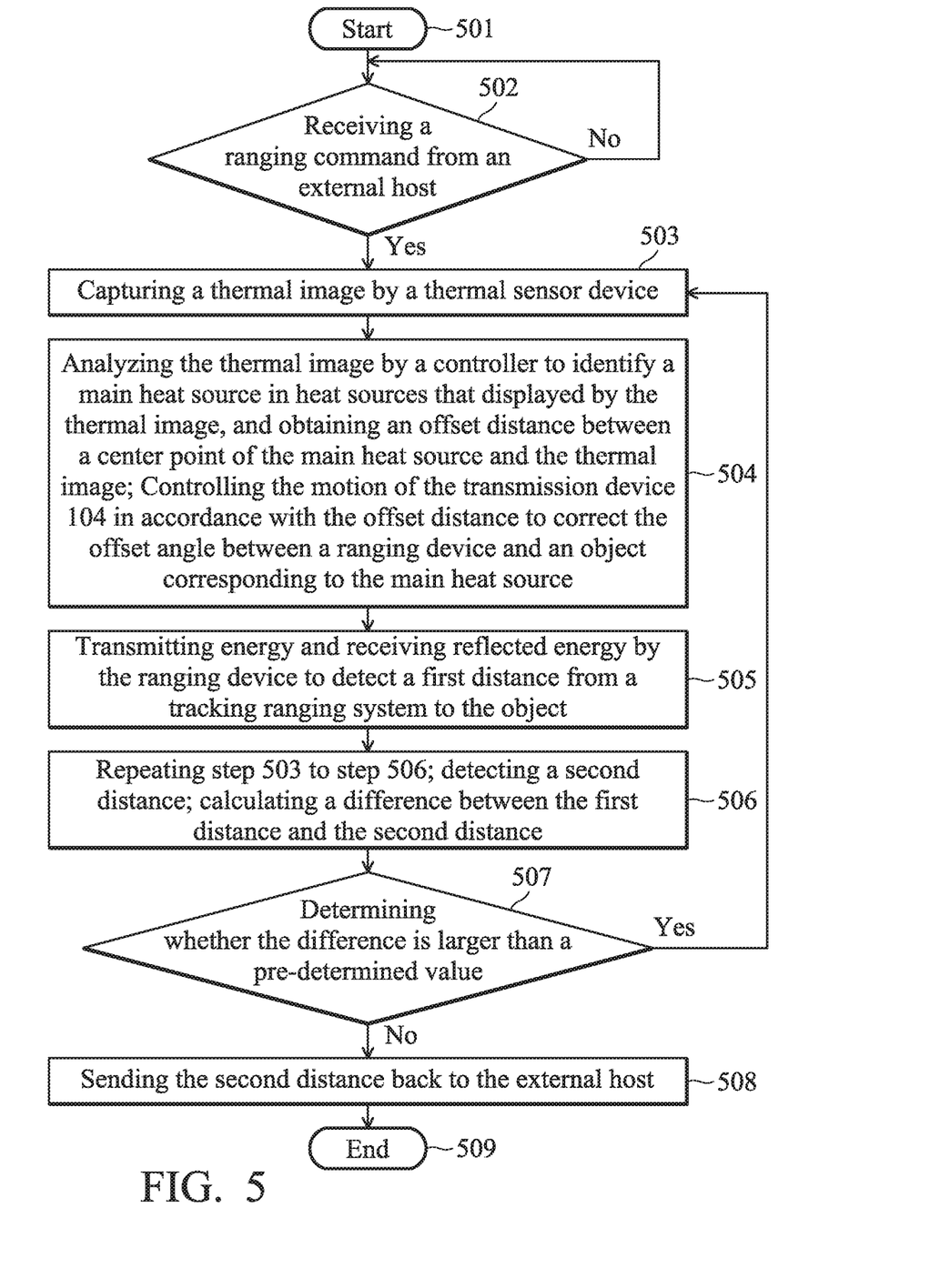
FIG. 5 is a flow chart of a tracking and ranging method in accordance with the first embodiment of the disclosure.

Refer to FIG. 5, which is a flow chart of a tracking and ranging method in accordance with the first embodiment of the disclosure. The tracking and ranging method is applied in a tracking and ranging system 100 that includes a thermal sensor device 101, a controller 102, a ranging device 103, and a transmission device 104, wherein the transmission device 104 loads the ranging device 103 and the thermal sensor device 101. The tracking and ranging system 100 is coupled to an external host 105 to receive ranging commands and to send the distance information back to the external host 105. Refer to FIG. 1 of the present invention. The tracking and ranging method starts at step 501. The tracking and ranging system 100 boots up. In step 502, the controller 102 determines whether to receive a ranging command from the external host 105. If no, the controller 102 keeps waiting; if yes, step 503 is performed. In step 503, a thermal image is captured by the thermal sensor device 101.

In step 504, the controller 102 analyzes the thermal image to identify the main heat source among the heat sources that are displayed in the thermal image, and the controller 102 obtains the offset distance between the center points of the main heat source and the thermal image. The controller 102 controls the motion of the transmission device 104 in accordance with the offset distance to correct the offset angle between the ranging device 103 and the object corresponding to the main heat source.

Then, in step 505, the ranging device 103 transmits energy and receives the reflected energy to detect the first distance to the object.

Then, in step 506, after the ranging device 103 detects the first distance, steps 503 through 506 are repeated. The controller 102 analyzes an updated thermal image and the controller 102 corrects the offset angle between the ranging device 103 and the object in accordance with the updated thermal image. A second distance to the object is detected by the ranging device 103. The controller 102 calculates the difference between the first distance and the second distance. In step 507, the controller 102 determines whether the difference is greater than a predetermined value. If the difference is greater than the predetermined value, the method returns to step 503; the step above is repeated; the latest distance is detected; and a determination is made as to whether the difference between the latest distance and the distance detected last time is greater than the predetermined value. If the difference is smaller than or equal to the predetermined value, step 508 is performed, and the controller 102 sends the second distance back to the external host 105. The tracking and ranging method ends at step 509.

Furthermore, it should be understood that in step 504, the analysis of the thermal image by the controller 102 first involves interpolating the thermal image, and then designating the thermal source blocks with the maximum area as the main heat source. Then, the controller 102 obtains the central position of the main heat source to calculate the offset distance between the central position and the center point of the thermal image. The controller 102 converts the offset distance to the offset angle in order to control the transmission device 104 to rotate the ranging device 103 in accordance with the offset angle, so that the ranging device 103 is aligned with the object that corresponds to the main heat source.

Furthermore, in step 507, when the difference is greater than the predetermined value, the tracking and ranging method returns to step 503, and the controller 102 analyzes another updated thermal image to obtain another offset angle, and controls the transmission device 104 to rotate the ranging device 103 in accordance with one-half of another offset angle. So on and so forth, in step 507, if the controller 102 determines that the difference is still greater than the predetermined value, after obtaining another updated offset angle, the transmission device 104 rotates the ranging device 103 in accordance with one-quarter or one-eighth of another updated offset angle to prevent damage caused by the tracking and ranging system 100 arbitrarily tracking a continuously moving object.

In summary, the present invention provides a novel tracking and ranging system and a method thereof, which is a benefit to human-robot interaction. The present invention adds a thermal sensor device to a ranging device. The thermal sensor device obtains a thermal image of an object. A controller obtains an offset angle after analyzing the thermal image. The controller drives a transmission device to retain the object in the middle position of the ranging device. The ranging device measures the distance to the object. The tracking and ranging system and the method thereof of the present invention can reduce a machine's dependence on computing performance, and reduce costs and save power.

The ordinal in the specification and the claims of the present invention, such as "first", "second", "third", etc., has no sequential relationship, and is just for distinguishing between two different devices with the same name. In the specification of the present invention, the word "couple" refers to any kind of direct or indirect electronic connection. The present invention is disclosed in the preferred embodiments as described above, however, the breadth and scope of the present invention should not be limited by any of the embodiments described above. For example, the method flow chart in FIG. 5 is implemented in a designated sequence, but persons skilled in the art can make small changes (such as changing or combining the steps illustrated in FIG. 5) and retouches without departing from the spirit and scope of the present invention. The scope of the present invention should be defined in accordance with the following claims and their equivalents.

What is claimed is:

1. A tracking and ranging system, comprising:
    a thermal sensor device, capturing a thermal image;
    a controller, analyzing the thermal image to identify a main heat source from heat sources displayed in the thermal image, and obtaining an offset distance between a center point of the main heat source and the thermal image;
    a ranging device, coupled to the controller;
    a transmission device, loading the ranging device and coupled to the controller;
    wherein the controller controls motion of the transmission device in accordance with the offset distance to correct an offset angle between the ranging device and an object corresponding to the main heat source, and after correcting the offset angle, the ranging device detects a first distance from the tracking and ranging system to the object by transmitting energy and receiving reflected energy.

2. The tracking and ranging system as claimed in claim 1, wherein the ranging device detects the first distance using a supersonic transmitter transmitting a supersonic signal and a supersonic receiver receiving a reflected supersonic signal corresponding to the supersonic signal.

3. The tracking and ranging system as claimed in claim 1, wherein the controller designates a heat source block with a maximum area as the main heat source after interpolating the thermal image, and obtains a central position of the main heat source to calculate the offset distance between the central position of the main heat source and the center point of the thermal image.

4. The tracking and ranging system as claimed in claim 1, wherein the transmission device loads the thermal sensor device; and the controller converts the offset distance to the offset angle, and controls the transmission device to rotate the ranging device in accordance with the offset angle, whereby the ranging device is aligned with the object corresponding to the main heat source.

5. The tracking and ranging system as claimed in claim 4, wherein after the ranging device detects the first distance, the controller analyzes an updated thermal image again, and corrects the offset angle between the ranging device and the object in accordance with the updated thermal image; the ranging device detects a second distance to the object.

6. The tracking and ranging system as claimed in claim 5, wherein the controller calculates a difference between the first distance and the second distance to determine whether the difference is greater than a predetermined value; when the difference is greater than the predetermined value, the controller analyzes another updated thermal image again to obtain another offset angle, and controls the transmission device to rotate the ranging device in accordance with one-half of the other offset angle.

7. A tracking and ranging method, which is applied on a tracking and ranging system comprising a thermal sensor device, a controller, a ranging device, and a transmission device, wherein the transmission device loads the ranging device; the method comprising:
    capturing a thermal image using the thermal sensor device;
    analyzing the thermal image to identify the main heat source from heat sources displayed in the thermal image, and obtaining an offset distance between a center point of the main heat source and the thermal image using the controller;
    controlling the motion of the transmission device in accordance with the offset distance to correct an offset angle between the ranging device and an object corresponding to the main heat source using the controller; and
    detecting a first distance from the tracking and ranging system to the object by transmitting energy and receiving reflected energy using the ranging device after correcting the offset angle.

8. The tracking and ranging method as claimed in claim 7, wherein the controller designates a heat source block with the maximum area as the main heat source after interpolating the thermal image, and obtains the central position of the main heat source to calculate the offset distance between the central position of the main heat source and the center point of the thermal image.

9. The tracking and ranging method as claimed in claim 7, wherein the transmission device loads the thermal sensor device; and by converting the offset distance to the offset angle, the controller controls the transmission device to rotate the ranging device in accordance with the offset angle, whereby the ranging device is aligned with the object corresponding to the main heat source.

10. The tracking and ranging method as claimed in claim 9, wherein after the ranging device detects the first distance, the controller analyzes an updated thermal image again, and corrects the offset angle between the ranging device and the object in accordance with the updated thermal image; the ranging device detects a second distance to the object; and the controller calculates the difference between the first distance and the second distance to determine whether the difference is greater than a predetermined value; when the difference is greater than the predetermined value, the controller analyzes another updated thermal image again to obtain another offset angle, and controls the transmission device to rotate the ranging device in accordance with one-half of the other offset angle.

\* \* \* \* \*